(12) United States Patent   (10) Patent No.: US 7,483,182 B2
Tsai   (45) Date of Patent: Jan. 27, 2009

(54) METHOD FOR ADJUSTING A SCANNING MODULE

(75) Inventor: Sheng-Chung Tsai, Chu Pei (TW)

(73) Assignee: Avision Inc. (TW)

( * ) Notice: Subject to any disclaimer, the term of this patent is extended or adjusted under 35 U.S.C. 154(b) by 1065 days.

(21) Appl. No.: 10/844,354

(22) Filed: May 13, 2004

(65) Prior Publication Data

US 2005/0007637 A1   Jan. 13, 2005

(30) Foreign Application Priority Data

Jul. 7, 2003   (TW) .............................. 92118516 A (51) Int. Cl.
*H01J 5/02* (2006.01)
*H04N 1/04* (2006.01)

(52) U.S. Cl. ...................... 358/474; 250/239
(58) Field of Classification Search ................. 358/474, 358/475; 250/239; 359/640; 348/48, 374
See application file for complete search history.

(56) References Cited

U.S. PATENT DOCUMENTS 5,559,556 A * 9/1996 Kagebeck ................... 348/374
5,570,231 A * 10/1996 Mogamiya ................... 359/640
6,512,363 B1 * 1/2003 Yamauchi et al. ........ 324/158.1
2004/0121503 A1 * 6/2004 Ferland et al. ................ 438/48
2004/0211893 A1 * 10/2004 Huang ......................... 250/239
2005/0036778 A1 * 2/2005 DeMonte ...................... 396/89
2005/0235506 A1 * 10/2005 Brost et al. .................... 33/502
2007/0065128 A1 * 3/2007 Liao et al. ...................... 396/55
2007/0237508 A1 * 10/2007 Hsieh et al. ................... 396/55

* cited by examiner

*Primary Examiner*—Jerome Grant, II (57) ABSTRACT

A method for adjusting a scanning module includes the steps of: providing a first fixing force to mount an adjustment assembly, to which an image sensor is attached, onto a base of the scanning module and loosely fixing the adjustment assembly to the base with a first fixing force; adjusting a relative position between the adjustment assembly and the base of the scanning module, and testing a first adjustment result until the first adjustment result is accepted; securing the adjustment assembly to the base of the scanning module with a second fixing force; and removing the first fixing force. The first and second fixing forces come from different sources.

20 Claims, 6 Drawing Sheets

METHOD FOR ADJUSTING A SCANNING MODULE

This Non-provisional application claims priority under 35 U.S.C. §119(a) on Patent Application No(s). 092118516 filed in Taiwan on Jul. 7, 2003, the entire contents of which are hereby incorporated by reference.

BACKGROUND OF THE INVENTION

1. Field of the Invention

The invention relates to a method for adjusting a scanning module, and more particularly to a method for adjusting and mounting a scanning module with the aid of a temporary fixing force.

2. Description of the Related Art

A scanning module is mainly applied to an image acquisition device, such as a scanner, a fax machine, a multi-function peripheral, or the like. The scanning module converts an image of a document into an electric signal, and thus usually includes an image sensor, such as a charge coupled device (CCD) image sensor. When the CCD image sensor is used, a lens and several reflecting mirrors are usually needed. The reflecting mirrors reflect an optical signal of the document to the lens, which focuses the optical signal onto the image sensor, which converts the optical signal into the electric signal.

In order to ensure the stable quality of the optical signal received by the image sensor, the scanning module has to be adjusted in the assembling processes. The adjusting method mainly includes the steps of adjusting the positions of the lens and the image sensor.

When the position of the image sensor is adjusted, a circuit board, on which the image sensor is attached, is screwed to the base of the scanning module by two screws in the prior art method. After the screwing process for the circuit board is finished, the adjuster tests the image quality. If the image quality is not above satisfactory in accordance with the standard measurements, the adjuster may slightly unscrew one or two of the screws and then move the circuit board. Next, the adjuster screws the circuit board to the base of the scanning module, and then tests the image quality. Such operations are repeated until the acceptable image quality is obtained.

Although the adjuster may monitor the image quality while unscrewing the screw and moving the circuit board so as to adjust the position of the loosened image sensor to an acceptable position, the position of the image sensor may slightly fluctuate after the screw is screwed tightly, and the image quality will be influenced again. Consequently, the conventional adjusting method has to be performed with the aid of considerable experiences, and it takes a long time to unscrew and screw the screw for the adjustment so as to obtain the optimum corresponding state between the image sensor and the lens.

SUMMARY OF THE INVENTION

It is therefore an object of the invention to provide a method for adjusting an image sensor without the repeated screwing and unscrewing operations.

Another object of the invention is to provide a method for adjusting and mounting a scanning module with the aid of a temporary fixing force, wherein the adjusting speed may be accelerated, and the manpower cost may be saved.

The invention achieves the above-identified objects by providing a method for adjusting a scanning module. The method includes the steps of: mounting an adjustment assembly onto a base of the scanning module, and loosely fixing the adjustment assembly to the base with a first fixing force; adjusting a relative position between the adjustment assembly and the base of the scanning module and testing a first adjustment result until the first adjustment result is accepted; securing the adjustment assembly to the base of the scanning module with a second fixing force; and removing the first fixing force, wherein the first fixing force and the second fixing force are provided by different sources.

The adjustment assembly may be an L-shaped structure, which has a first plate and a second plate substantially vertically connected to the first plate, wherein the first plate is fixed to the base of the scanning module.

The above-mentioned method may further includes the steps of: mounting a circuit board, to which an image sensor is attached, onto the second plate, and loosely fixing the circuit board to the second plate with a third fixing force; adjusting a relative position between the circuit board and the adjustment assembly and testing a second adjustment result until the second adjustment result is accepted; and fixing the circuit board to the second plate with a fourth fixing force, wherein the third and fourth fixing forces are provided by different sources.

Each of the first and third fixing forces may be a magnetic force, an adhesive force, a pushing force, an elastic force or a vacuuming force.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

Figure 1:
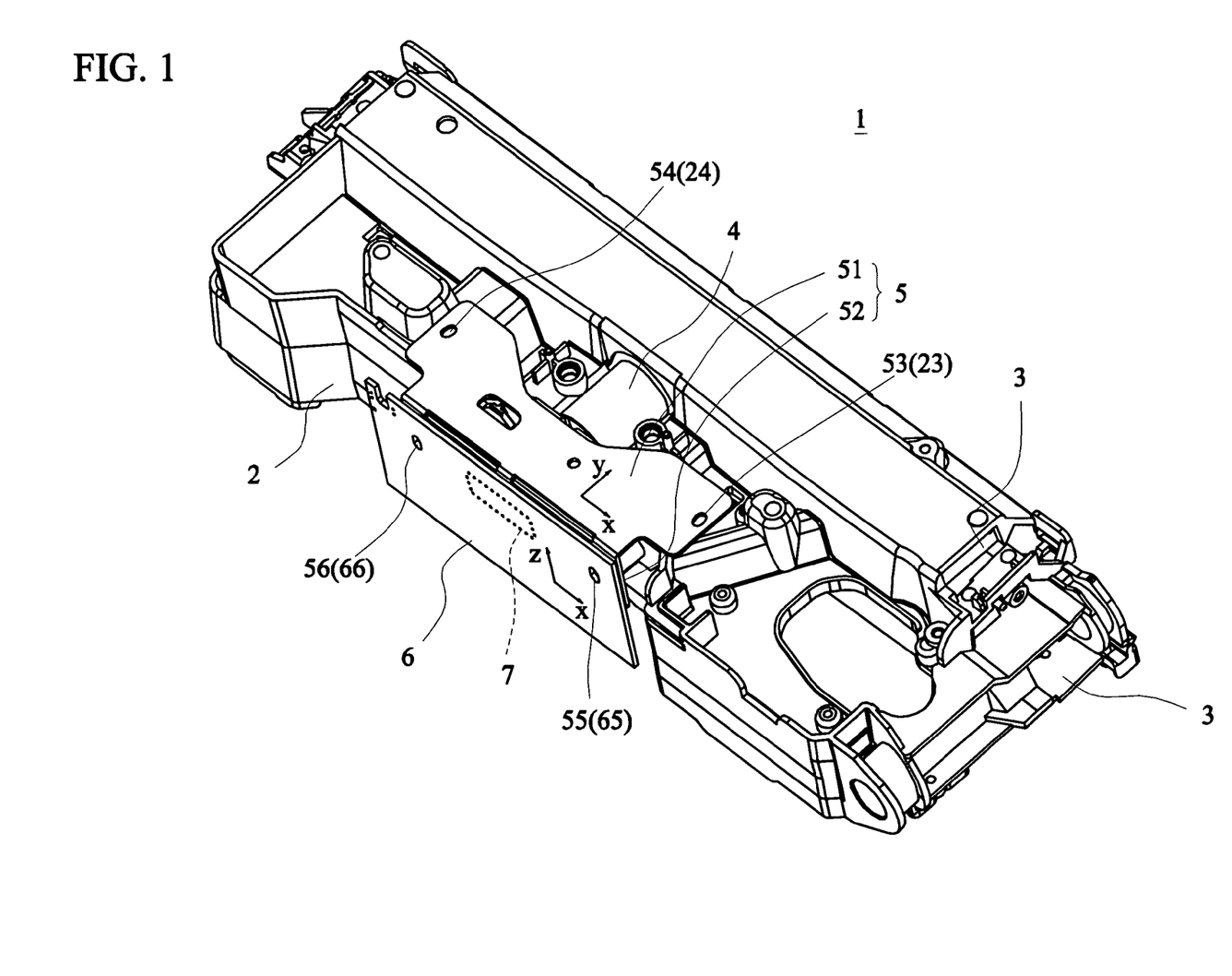
FIG. 1 is a pictorial view showing a scanning module of the invention.

FIG. 1 is a pictorial view showing a scanning module of the invention. Referring to FIG. 1, the scanning module 1 of the invention includes a base 2, a plurality of reflecting mirrors 3 (only some reflecting mirrors are shown), a lens 4, an adjustment assembly 5, a circuit board 6, and an image sensor 7. The adjustment assembly 5 has an L-shaped structure, which includes a first plate 51 and a second plate 52 substantially vertically connected to the first plate 51. The reflecting mirrors 3, the lens 4 and the first plate 51 of the adjustment assembly 5 are fixed to the base 2, the image sensor 7 is fixed to the circuit board 6, and the circuit board 6 is fixed to the second plate 52 of the adjustment assembly 5. The first plate 51 is formed with two elliptic holes 53 and 54, and two screws (not shown) may pass through the elliptic holes 53 and 54 to screw the first plate 51 to two screw holes 23 and 24 of the base 2, respectively. The second plate 52 is formed with two screw holes 55 and 56, the circuit board 6 is formed with two elliptic holes 65 and 66, and another set of two screws (not shown) may pass through the elliptic holes 65 and 66 to screw the circuit board 6 to the second plate 52, respectively.

Before the adjustment assembly 5 is screwed to the base 2, the adjuster may move and adjust the position of the adjustment assembly 5 along the x-axis and y-axis directions, and/or rotate and adjust the angle of the adjustment assembly 5 about the z-axis. Before the circuit board 6 is screwed to the second plate 52 of the adjustment assembly 5, the adjuster may move and adjust the position of the circuit board 6 along the x-axis and z-axis directions, and/or rotate and adjust the angle of the circuit board 6 about the y-axis.

Figure 2:
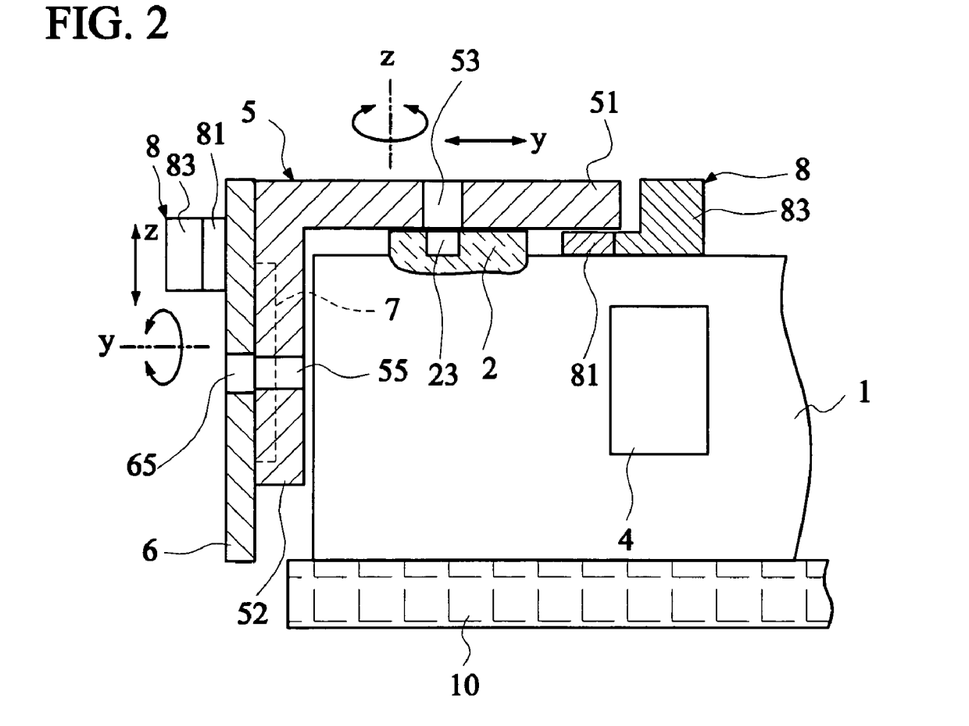
FIG. 2 is a schematic illustration showing a method for adjusting a scanning module according to a first embodiment of the invention.
Figure 3:
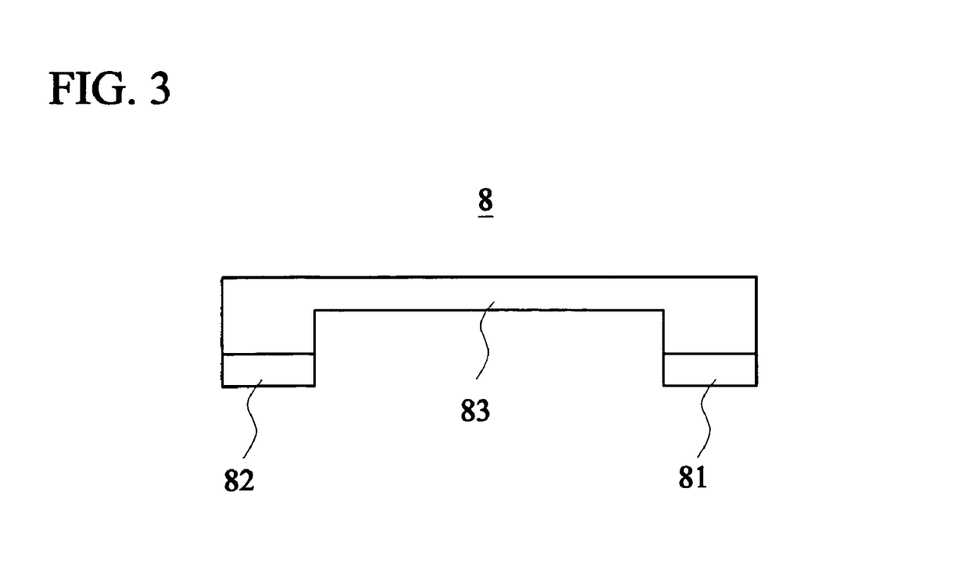
FIG. 3 is a schematic illustration showing a magnetic assembly of FIG. 2.

FIG. 2 is a schematic illustration showing a method for adjusting a scanning module according to a first embodiment of the invention. FIG. 3 is a schematic illustration showing a magnetic assembly 8 of FIG. 2. Referring to FIG. 3, the magnetic assembly 8 includes two magnets 81 and 82 and a connecting portion 83 connecting the magnet 81 to the magnet 82. The method for adjusting the scanning module of the invention will be described with reference to FIGS. 2 and 3. First, the scanning module 1 is fixed to a table 10.

Then, a first mounting step, which is for mounting the first plate 51 of the adjustment assembly 5 onto the base 2 of the scanning module 1, and loosely fixing the adjustment assembly to the base with a first fixing force, is performed. It is to be noted that an image sensor 7 may be attached to the adjustment assembly 5 in advance, wherein the image sensor 7 may be attached to the adjustment assembly 5 by way of a circuit board 6 mentioned hereinafter. In this step, the adjuster may directly dispose the adjustment assembly 5 on the base 2 of the scanning module 1, and then fix the magnetic assembly 8 to the scanning module 1 in order to attract the first plate 51 (e.g., a metal plate) of adjustment assembly 5 and thus form the first fixing force belonging to the magnetic force. For example, the magnetic assembly 8 may be fixed to the scanning module 1 by screws in advance, and then the adjustment assembly 5 may be disposed on the base 2 of the scanning module 1. At this time, the magnets 81 and 82 of the magnetic assembly 8 attract the first plate 51 so as to mount the adjustment assembly 5 onto the base 2 and loosely fix the adjustment assembly 5 to the base 2. It is to be noted that the magnetic assembly 8 also may be composed of only one magnet, or three or more than three magnets.

Next, a second mounting step for mounting the circuit board 6, to which the image sensor 7 is attached, onto the second plate 52 of the adjustment assembly 5 and loosely fixing the circuit board 6 to the second plate 52 with a third fixing force is performed. In this step, it is also possible to adopt another magnetic assembly 8 to attract the circuit board 6 to the second plate 52 of the adjustment assembly 5 and thus provide the third fixing force. It is to be noted that the magnetic assembly 8 also may be composed of only one magnet, or three or more than three magnets.

Then, a first adjusting step, which is for adjusting the relative position between the first plate 51 of the adjustment assembly 5 and the base 2 of the scanning module 1 and for testing a first adjustment result until the first adjustment result is accepted, is performed.

Next, a second adjusting step, which is for adjusting the relative position between the circuit board 6 and the second plate 52 of the adjustment assembly 5 and for testing a second adjustment result until the second adjustment result is accepted, is performed. It is to be noted that the first and second adjusting steps may be performed simultaneously until both of the first and second adjustment results are accepted.

Then, a first fixing step, which is for fixing the first plate 51 of the adjustment assembly 5 to the base 2 of the scanning module 1 with a second fixing force, is performed. For example, the adjuster may use two screws to provide the second fixing force to screw the first plate 51 to the base 2, and thus complete the overall mounting steps for the adjustment assembly 5.

Next, a second fixing step, which is for fixing the circuit board 6 to the second plate 52 with a fourth fixing force, is performed. For example, the adjuster may use two screws to provide the fourth fixing force to screw the circuit board 6 to the second plate 52, and thus complete the overall mounting steps of the image sensor 7.

Then, the adjuster removes the magnetic assembly 8 from the first plate 51 of the adjustment assembly 5 so as to remove the first fixing force. Next, the adjuster removes another magnetic assembly 8 from the second plate 52 of the adjustment assembly 5 so as to remove the third fixing force. Finally, the adjuster removes the scanning module 1 from the table 10 and completes the overall adjusting and assembling processes.

Although the first and third fixing forces in the first embodiment are the magnetic forces, other fixing forces such as adhesive forces and pushing forces may be adopted as long as the two components can be fixed to each other without sliding. Other associated embodiments will be described in the following.

Figure 4:
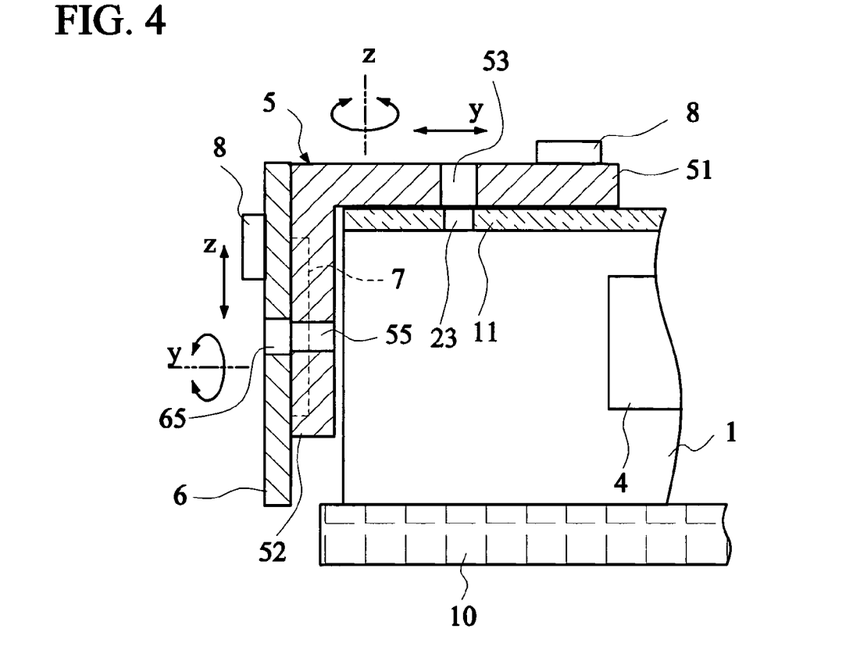
FIG. 4 is a schematic illustration showing a method for adjusting a scanning module according to a second embodiment of the invention.

FIG. 4 is a schematic illustration showing a method for adjusting a scanning module according to a second embodiment of the invention. As shown in FIG. 4, except for the first mounting step that is different from that of the first embodiment, other steps are the same as those of the first embodiment.

In this embodiment, the first mounting step is performed according to the process of disposing the magnetic assembly 8 on the first plate 51 of the adjustment assembly 5 to attract a ferromagnetic component 11 (e.g. a metal plate) of the scanning module 1, which is located underneath the first plate 51 of the adjustment assembly 5, and to consequently form the first fixing force.

Figure 5:
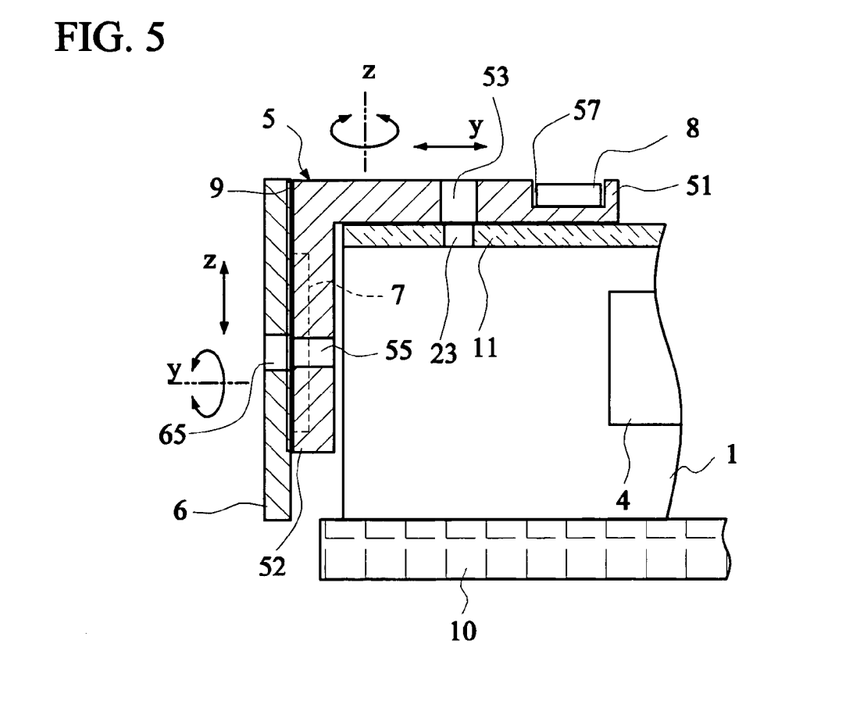
FIG. 5 is a schematic illustration showing a method for adjusting a scanning module according to a third embodiment of the invention.

FIG. 5 is a schematic illustration showing a method for adjusting a scanning module according to a third embodiment of the invention. As shown in FIG. 5, except for the first and second mounting steps that are different from those of the second embodiment, other steps are the same as those of the second embodiment. In this embodiment, the first mounting step is performed according to the process of disposing a magnetic assembly 8 between two counterbores 57 of the first plate 51 of the adjustment assembly 5 to attract a ferromagnetic component 11 of the scanning module 1, which is located underneath the first plate 51 of the adjustment assembly 5, and to consequently form a first fixing force. Because the distance between the magnetic assembly 8 and the ferromagnetic component 11 is shortened, a greater first fixing force may be provided. In addition, the second mounting step is performed according to the process of applying an adhesive agent 9 to a portion between the circuit board 6 and the second plate 52 of the adjustment assembly 5 so as to provide the third fixing force belonging to the adhesive force, which does not have to be removed.

It is to be noted that the adhesive force also may serve as the first fixing force in the first mounting step. In this case, it is possible to apply an adhesive agent to a portion between the adjustment assembly 5 and the scanning module 1 so as to provide the first fixing force.

Figure 6:
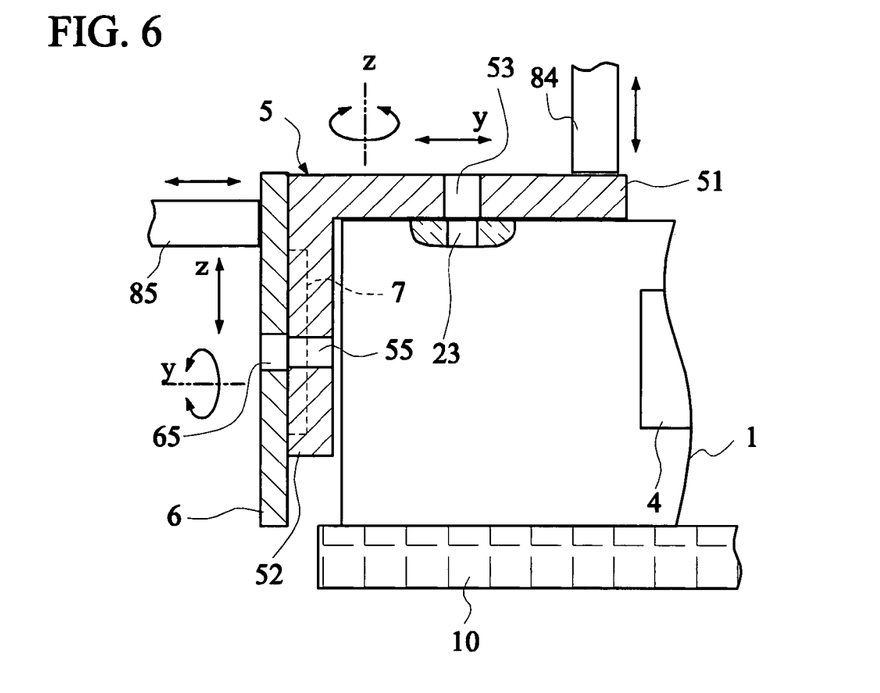
FIG. 6 is a schematic illustration showing a method for adjusting a scanning module according to a fourth embodiment of the invention.

FIG. 6 is a schematic illustration showing a method for adjusting a scanning module according to a fourth embodiment of the invention. As shown in FIG. 6, the first and third fixing forces of this embodiment belong to the pushing forces, which are provided by the push rods 84 and 85, respectively. The pushing forces provided by the push rods 84 and 85 have the same effects as those of the magnetic force and have to be removed at last, and detailed descriptions thereof will be omitted.

Figure 7:
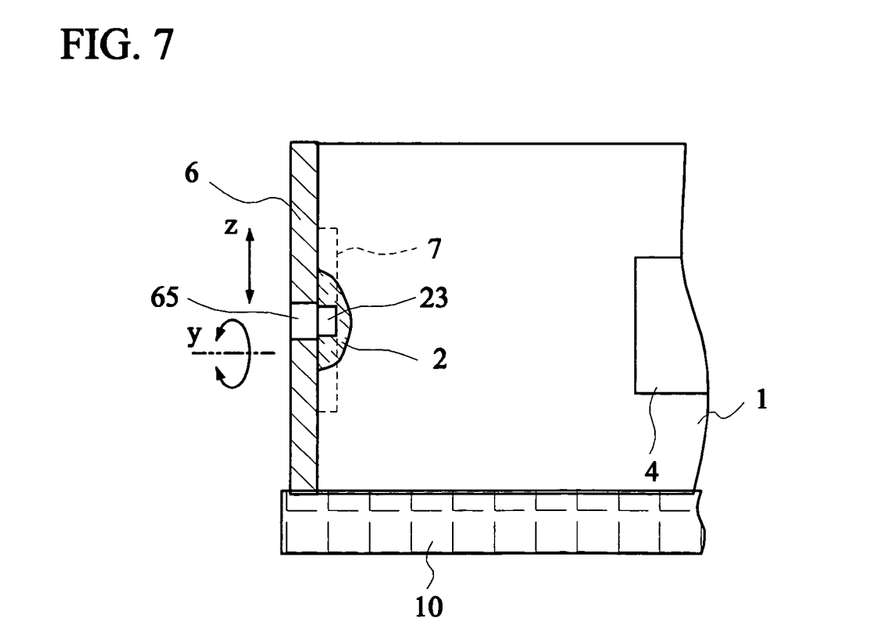
FIG. 7 is a schematic illustration showing another method for adjusting a scanning module according to a fifth embodiment of the invention.

FIG. 7 is a schematic illustration showing another method for adjusting a scanning module according to a fifth embodiment of the invention. As shown in FIG. 7, the method of the invention also may be utilized to fix an image sensor 7 to a circuit board 6 having only a single plate. First, the scanning module 1 is fixed to the table 10. Then, the circuit board 6 is mounted onto a base 2 of the scanning module 1, and the circuit board 6 is loosely fixed to the base 2 of the scanning module 1 with a first fixing force. Next, the relative position between the circuit board 6 and the scanning module 1 is adjusted, and a first adjustment result is tested until the first adjustment result is accepted. Thereafter, the circuit board 6 is fixed to the base 2 of the scanning module 1 with a second fixing force. In this embodiment, the above-mentioned magnetic force, adhesive force or pushing force also may serve as the first fixing force.

Figure 8:
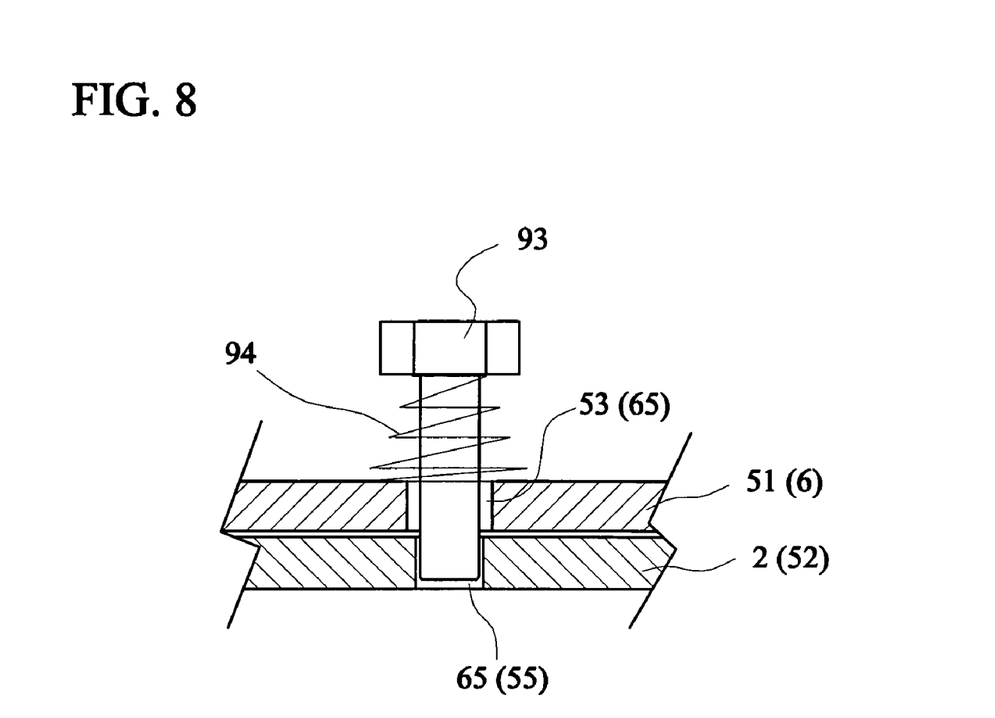
FIG. 8 is a first schematic illustration showing that two assemblies are mounted to each other according to a sixth embodiment of the invention.
Figure 9:
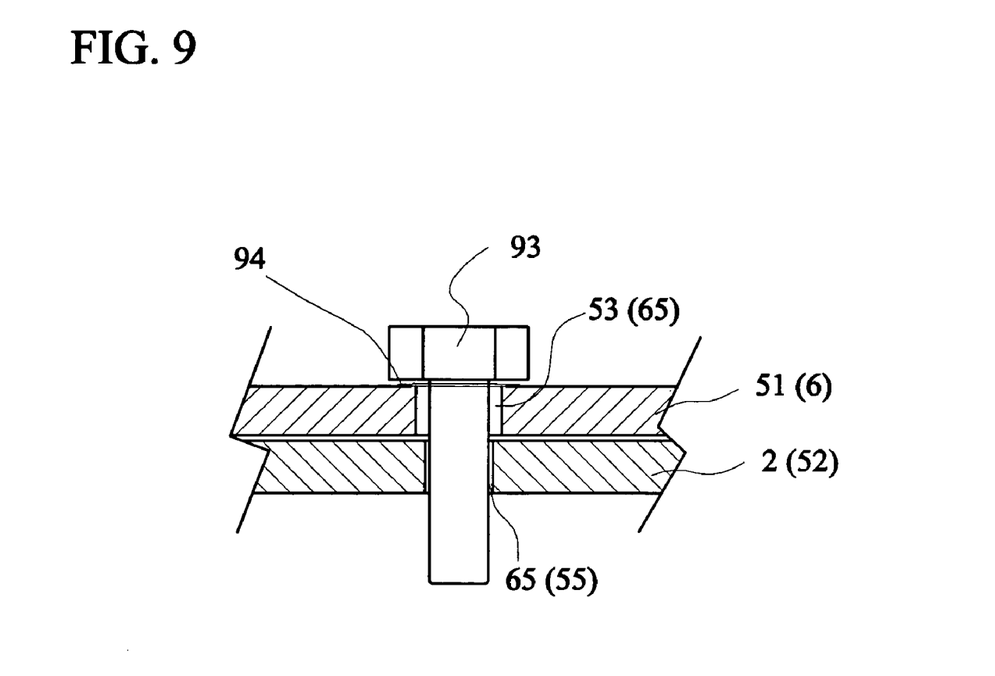
FIG. 9 is a second schematic illustration showing that the two assemblies are mounted to each other according to the sixth embodiment of the invention.

FIGS. 8 and 9 are first and second schematic illustrations showing that two assemblies are mounted to each other according to a sixth embodiment of the invention. As shown in FIGS. 8 and 9, when the first plate 51 of the adjustment assembly and the base 2 are temporarily fixed by the first fixing force and permanently fixed by the second fixing force, or when the second plate 52 of the adjustment assembly and the circuit board 6 are temporarily fixed by the third fixing force and permanently fixed by the fourth fixing force, a spring 94 and a screw 93 inserted in the spring 94 may be utilized.

When the first mounting step is performed, the spring 94 and the screw 93 inserted in the spring 94 are utilized to screw the first plate 51 of the adjustment assembly to the base 2. Thus, the elastic force of the spring 94 may form the first fixing force.

When the first fixing step is performed, the screw 93 and the spring 94 are utilized to screw the first plate 51 of the adjustment assembly to the base 2. The second fixing force comes from the screw force of the screw 93, and the second fixing force is greater than the first fixing force. In this embodiment, the spring 94 is a Belleville spring, which will be pressed and flattened when the screw 93 is tightly screwed to the base 2. Alternatively, the spring 94 also may be a helical spring.

When the second mounting step is performed, the spring 94 and the screw 93 inserted in the spring 94 are utilized to screw the circuit board 6 to the second plate 52 of the adjustment assembly. Thus, the elastic force of the spring 94 may form the third fixing force.

When the second fixing step is performed, the screw 93 and the spring 94 are utilized to screw the circuit board 6 to the first plate 51 of the adjustment assembly. The fourth fixing force comes from the screw force of the screw 93, and the fourth fixing force is greater than the third fixing force.

Figure 10:
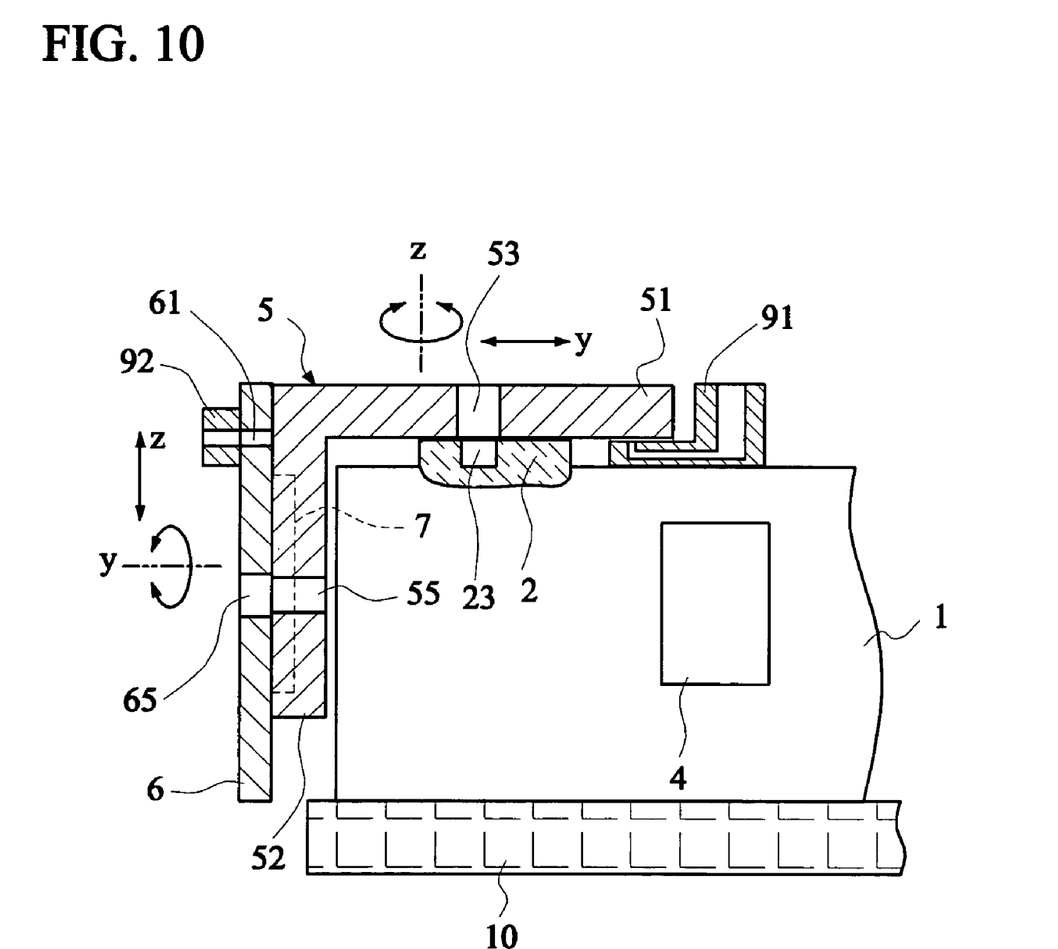
FIG. 10 is a schematic illustration showing still another method for adjusting a scanning module according to a seventh embodiment of the invention.

FIG. 10 is a schematic illustration showing still another method for adjusting a scanning module according to a seventh embodiment of the invention. As shown in FIG. 10, the embodiment is similar to FIG. 2 but different from FIG. 2 in that a first sucker 91 and a second sucker 92 are utilized to perform the first mounting step and the second mounting step, respectively, in this embodiment. Consequently, in the first mounting step, the first sucker 91 is mounted to the base 2 of the scanning module 1. The first fixing force is formed by way of vacuuming which pulls the first plate 51 of adjustment assembly 5 to the base 2 of the scanning module 1. In the second mounting step, the second sucker 92 is mounted to the circuit board 6 formed with a vacuum suction hole 61 attached, and the circuit board 6 is pulled to the second plate 52 to form the third fixing force by way of vacuuming. It is also very convenient to the temporary fixation by way of vacuuming.

Consequently, the first and second fixing forces are provided by different sources, and the third and fourth fixing forces are also provided by different sources. In addition, the above-mentioned magnetic force, pushing force, adhesive force, elastic force and vacuuming force also may be optionally used in any embodiment.

According to the temporary fixation method of the invention, the adjuster may adjust the image sensor to find an optimum state thereof and then permanently fix the image sensor to the scanning module without the repeated screwing operations. Hence, the adjusting and assembling processes may be performed more smoothly.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A method for adjusting a scanning module, comprising:
   a first mounting step for mounting an adjustment assembly, to which an image sensor is attached, onto a base of the scanning module, and loosely fixing the adjustment assembly to the base with a first fixing force, wherein the adjustment assembly is an L-shaped structure, which has a first plate and a second plate substantially vertically connected to the first plate, and the first plate is fixed to the base of the scanning module;
   a first adjusting step for adjusting a relative position between the adjustment assembly and the base of the scanning module, and for testing a first adjustment result until the first adjustment result is accepted; and
   a first fixing step for securing the adjustment assembly to the base of the scanning module with a second fixing force, wherein the first fixing force and the second fixing force are provided by different sources.

2. The method according to claim 1, wherein the first fixing force is selected from the group consisting of a magnetic force, an adhesive force, a pushing force, an elastic force and a vacuuming force.

3. The method according to claim 1, wherein the first mounting step comprises:
 disposing a magnetic assembly on the adjustment assembly to attract a ferromagnetic component of the scanning module and to consequently form the first fixing force.

4. The method according to claim 3, wherein the magnetic assembly comprises a magnet.

5. The method according to claim 4, wherein the magnet is disposed in a counterbore of the adjustment assembly.

6. The method according to claim 3, wherein the magnetic assembly comprises two magnets and a connecting portion for connecting the magnets.

7. The method according to claim 6, wherein the magnets are disposed in two counterbores of the adjustment assembly, respectively.

8. The method according to claim 1, wherein the first mounting step comprises:
 fixing a magnetic assembly to the base of the scanning module in order to attract the adjustment assembly and form the first fixing force.

9. The method according to claim 8, wherein the magnetic assembly comprises a magnet.

10. The method according to claim 8, wherein the magnetic assembly comprises two magnets and a connecting portion for connecting the magnets.

11. The method according to claim 1, further comprising a step of removing the first fixing force after the first fixing step.

12. The method according to claim 1, wherein the first mounting step comprises:
 applying an adhesive agent to a portion between the adjustment assembly and the base of the scanning module in order to provide the first fixing force.

13. The method according to claim 1, wherein the image sensor is attached to the adjustment assembly by first being installed on a circuit board, and the method further comprises:
 a second mounting step for mounting the circuit board onto the second plate and loosely fixing the circuit board to the second plate with a third fixing force;
 a second adjusting step for adjusting a relative position between the circuit board and the adjustment assembly and for testing a second adjustment result until the second adjustment result is accepted; and
 a second fixing step for securing the circuit board to the second plate with a fourth fixing force, wherein the third fixing force and the fourth fixing force are provided by different sources.

14. The method according to claim 13, wherein the second mounting step comprises mounting a sucker to the circuit board formed with a vacuum suction hole attached, wherein the third fixing force is formed by way of vacuuming which pulls the circuit board to the second plate.

15. The method according to claim 13, wherein the first fixing force is selected from the group consisting of a magnetic force, an adhesive force, a pushing force, an elastic force, and a vacuuming force, and the third fixing force is selected from the group consisting of the magnetic force, the adhesive force, the pushing force, the elastic force, and the vacuuming force.

16. The method according to claim 13, further comprising a step of removing the third fixing force after the second fixing step.

17. The method according to claim 13, wherein the second mounting step comprises:
 applying an adhesive agent to a portion between the circuit board and the adjustment assembly in order to provide the third fixing force.

18. The method according to claim 1, wherein the first mounting step comprises mounting a sucker to the base of the scanning module, wherein the first fixing force is formed by way of vacuuming which pulls the adjustment assembly to the base of the scanning module.

19. The method according to claim 1, wherein the first mounting step comprises:
 screwing the adjustment assembly to the base using a screw inserted in a spring, wherein an elastic force of the spring forms the first fixing force; and
 the first fixing step comprises screwing the adjustment assembly to the base using the screw inserted in the spring, wherein a screw force of the screw provides the second fixing force, which is greater than the first fixing force.

20. The method according to claim 19, wherein the spring is a helical spring or a Belleville spring.

* * * * *